United States Patent
Jain et al.

(10) Patent No.: US 12,526,762 B2
(45) Date of Patent: Jan. 13, 2026

(54) TRACKING AREA UPDATES BASED ON FREQUENCY BAND CONDITIONS

(71) Applicant: QUALCOMM Incorporated, San Diego, CA (US)

(72) Inventors: Hitesh Jain, Hyderabad (IN); Sarath Kumar Pujari, Hyderabad (IN); Ansah Ahmed Sheik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 17/938,830

(22) Filed: Oct. 7, 2022

(65) Prior Publication Data

US 2024/0121742 A1    Apr. 11, 2024

(51) Int. Cl.
*H04W 60/04* (2009.01)
*H04W 24/10* (2009.01)

(52) U.S. Cl.
CPC ........... *H04W 60/04* (2013.01); *H04W 24/10* (2013.01)

(58) Field of Classification Search
CPC .. H04W 36/0058; H04W 48/18; H04W 60/04
USPC .......................................................... 370/331
See application file for complete search history.

(56) References Cited

U.S. PATENT DOCUMENTS

| 2018/0098255 A1 | 4/2018 | Murugan et al. |
| 2021/0045177 A1 | 2/2021 | Lee et al. |
| 2021/0076438 A1 * | 3/2021 | Lee ................... H04W 36/0058 |
| 2023/0328613 A1 * | 10/2023 | Gupta ................. H04W 48/18 370/331 |
| 2024/0121742 A1 * | 4/2024 | Jain ...................... H04W 60/04 |

FOREIGN PATENT DOCUMENTS

| CN | 109193788 A | * | 1/2019 | ............. H02J 3/382 |
| CN | 112539136 A | * | 3/2021 | ............... F03D 7/00 |
| CN | 113766641 A | * | 12/2021 | ............ H04W 72/21 |
| CN | 114554478 A | * | 5/2022 | .............. H04W 8/24 |
| CN | 112539136 B | * | 8/2022 | .............. H02P 9/06 |
| CN | 114554478 B | * | 12/2023 | .............. H04W 8/22 |
| FI | 112539136 A | * | 3/2021 | ............... F03D 7/00 |
| WO | WO-2022099315 A1 | | 5/2022 | |
| WO | WO-2022111270 A1 | | 6/2022 | |
| WO | WO-2023201155 A1 | * | 10/2023 | ........ H04W 36/0058 |
| WO | WO-2024076838 A1 | * | 4/2024 | ........... H04W 60/04 |

OTHER PUBLICATIONS

English translation of CN114554478, May 2025 (Year: 2025).*
International Search Report and Written Opinion—PCT/US2023/074576—ISA/EPO—Dec. 11, 2023.

* cited by examiner

*Primary Examiner* — William D Cumming
(74) *Attorney, Agent, or Firm* — Harrity & Harrity LLP/Qualcomm Incorporated

(57) ABSTRACT

Various aspects generally relate to wireless communication. In some aspects, a user equipment (UE) may detect a condition associated with a frequency band for the UE. Accordingly, the UE may trigger a tracking area update based at least in part on detecting the condition. Alternatively, the UE may trigger a registration update based at least in part on detecting the condition. Numerous other aspects are described.

20 Claims, 8 Drawing Sheets

TRACKING AREA UPDATES BASED ON FREQUENCY BAND CONDITIONS

FIELD OF THE DISCLOSURE

Aspects of the present disclosure generally relate to wireless communication and to techniques and apparatuses for tracking area updates based on frequency band conditions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to detect a condition associated with a frequency band for the UE. The one or more processors may be configured to trigger a tracking area update (TAU) or a registration update based at least in part on the condition being detected.

Some aspects described herein relate to an apparatus for wireless communication at a network entity. The apparatus may include a memory and one or more processors coupled to the memory. The one or more processors may be configured to receive a first capability message, associated with a UE, that indicates at least one first frequency band combination. The one or more processors may be configured to receive a TAU request or a registration update request, associated with the UE. The one or more processors may be configured to receive a second capability message, associated with the UE, that indicates at least one second frequency band combination.

Some aspects described herein relate to a method of wireless communication performed by a UE. The method may include detecting a condition associated with a frequency band for the UE. The method may include triggering a TAU or a registration update based at least in part on detecting the condition.

Some aspects described herein relate to a method of wireless communication performed by a network entity. The method may include receiving a first capability message, associated with a UE, that indicates at least one first frequency band combination. The method may include receiving a TAU request or a registration update request, associated with the UE. The method may include receiving a second capability message, associated with the UE, that indicates at least one second frequency band combination.

Some aspects described herein relate to a non-transitory computer-readable medium that stores a set of instructions for wireless communication by a UE. The set of instructions, when executed by one or more processors of the UE, may cause the UE to detect a condition associated with a frequency band for the UE. The set of instructions, when executed by one or more processors of the UE, may cause the UE to trigger a TAU or a registration update based at least in part on the condition being detected.

Some aspects described herein relate to a non-transitory computer-readable medium that stores a set of instructions for wireless communication by a network entity. The set of instructions, when executed by one or more processors of the network entity, may cause the network entity to receive a first capability message, associated with a UE, that indicates at least one first frequency band combination. The set of instructions, when executed by one or more processors of the network entity, may cause the network entity to receive a TAU request or a registration update request, associated with the UE. The set of instructions, when executed by one or more processors of the network entity, may cause the network entity to receive a second capability message, associated with the UE, that indicates at least one second frequency band combination.

Some aspects described herein relate to an apparatus for wireless communication. The apparatus may include means for detecting a condition associated with a frequency band for the apparatus. The apparatus may include means for triggering a TAU or a registration update based at least in part on the condition being detected.

Some aspects described herein relate to an apparatus for wireless communication. The apparatus may include means for receiving a first capability message, associated with a UE, that indicates at least one first frequency band combination. The apparatus may include means for receiving a TAU request or a registration update request, associated with the UE. The apparatus may include means for receiving a second capability message, associated with the UE, that indicates at least one second frequency band combination.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
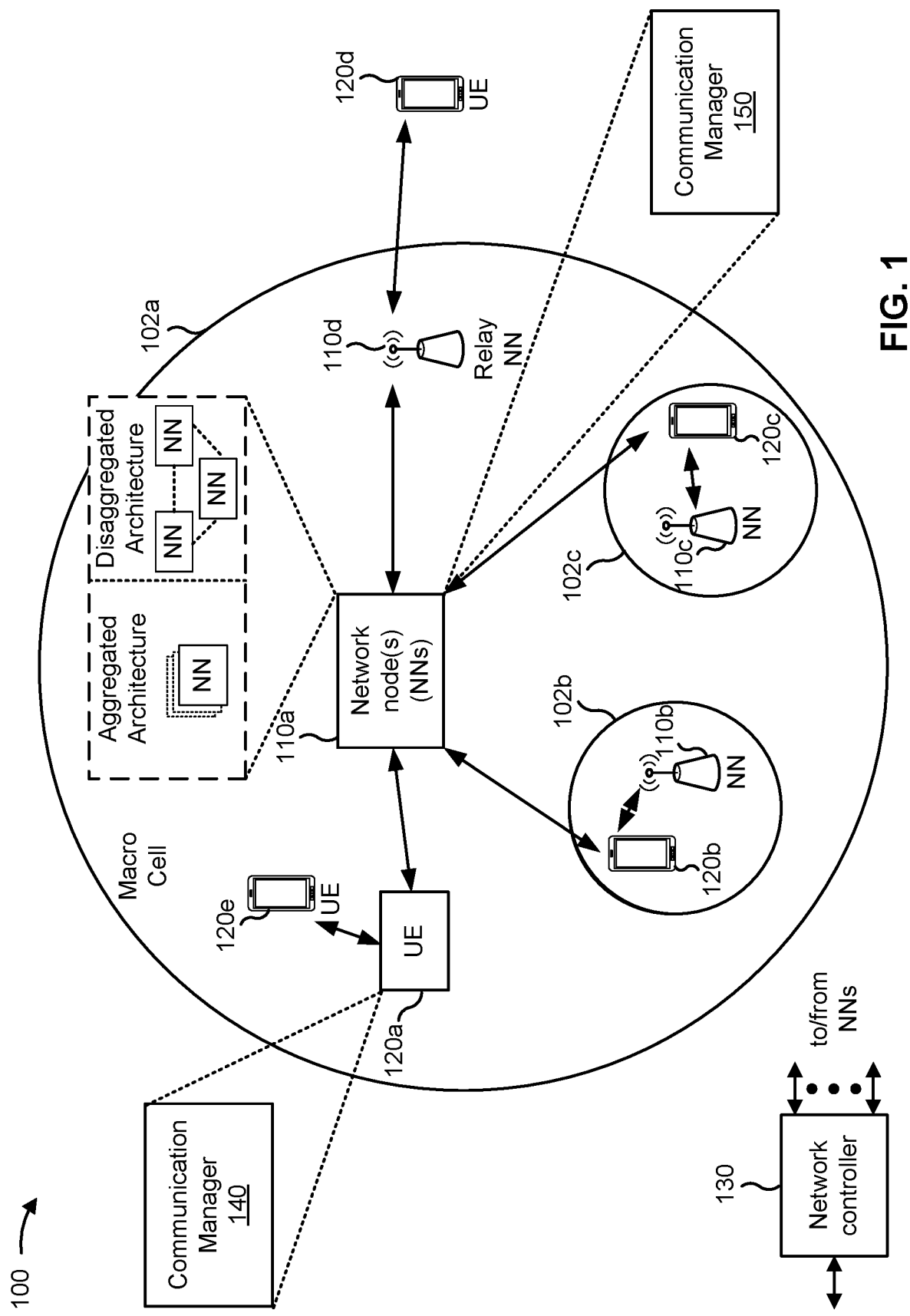
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect a condition associated with a frequency band for the UE 120 and trigger a tracking area update (TAU) or a registration update based at least in part on detecting the condition. Additionally, or alternatively, the communication manager 140 may perform one or more other operations described herein.

In some aspects, a network entity (e.g., the network node 110) may include a communication manager 150. As described in more detail elsewhere herein, the communication manager 150 may receive a first capability message, associated with the UE 120, that indicates at least one first frequency band combination, may receive a TAU request or a registration update request associated with the UE 120, and may receive a second capability message, associated with the UE 120, that indicates at least one second frequency band combination. Additionally, or alternatively, the communication manager 150 may perform one or more other operations described herein.

As indicated above, FIG. 1 is provided as an example. Other examples may differ from what is described with regard to FIG. 1.

Figure 2:
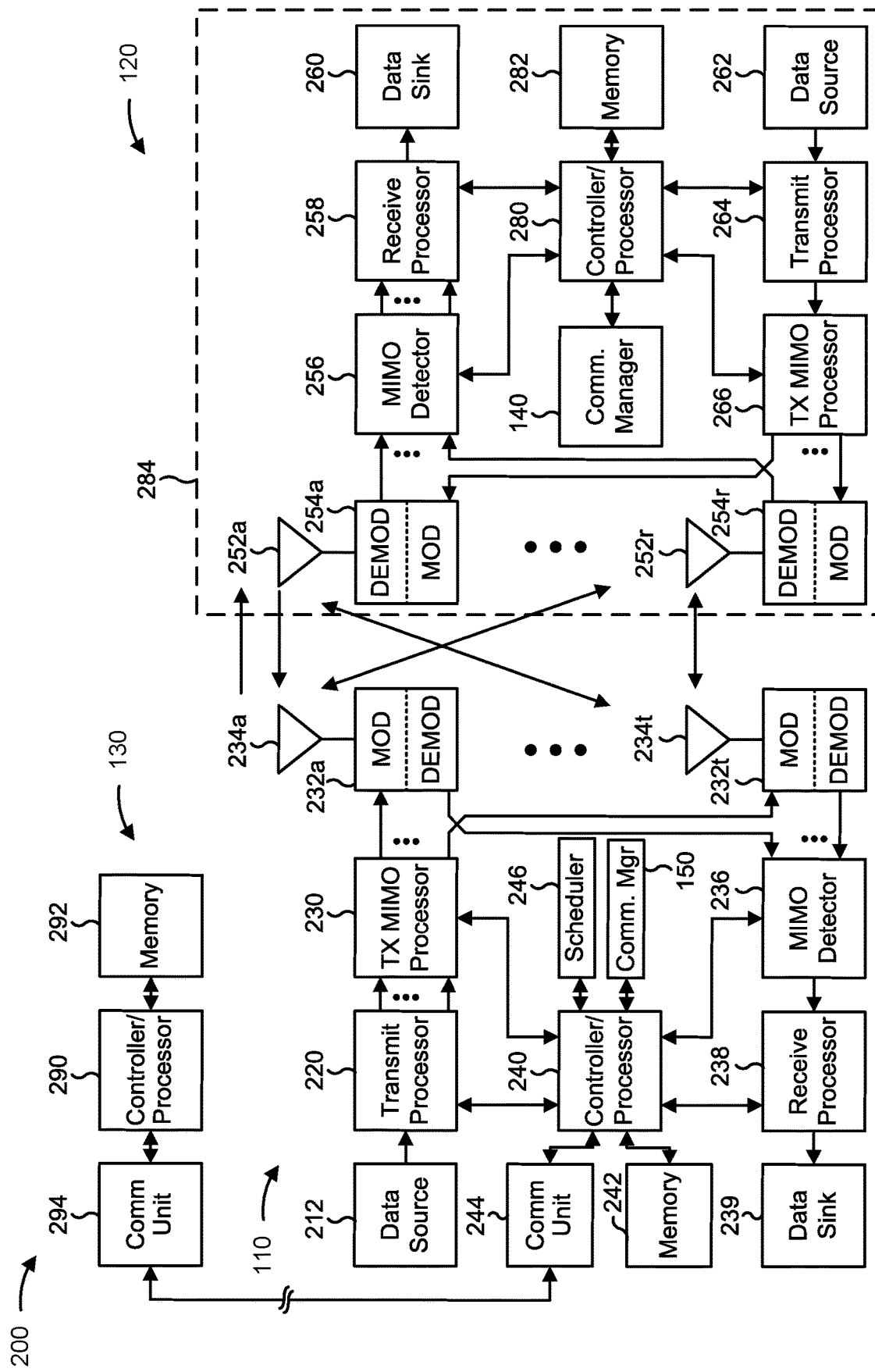
FIG. 2 is a diagram illustrating an example of a network node in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the network node 110, the controller/processor 280 of the UE 120, and/or any other component(s) of FIG. 2 may perform one or more techniques associated with TAUs based on frequency band conditions, as described in more detail elsewhere herein. For example, the controller/processor 240 of the network node 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 700 of FIG. 7) may include means for detecting a condition associated with a frequency band for the UE (e.g., using antenna 252, modem 254, MIMO detector 256, receive processor 258, controller/processor 280, or memory 282); and/or means for triggering a TAU or a registration update based at least in part on detecting the condition (e.g., using controller/processor 280, transmit processor 264, TX MIMO processor 266, modem 254, antenna 252, or memory 282). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 7:
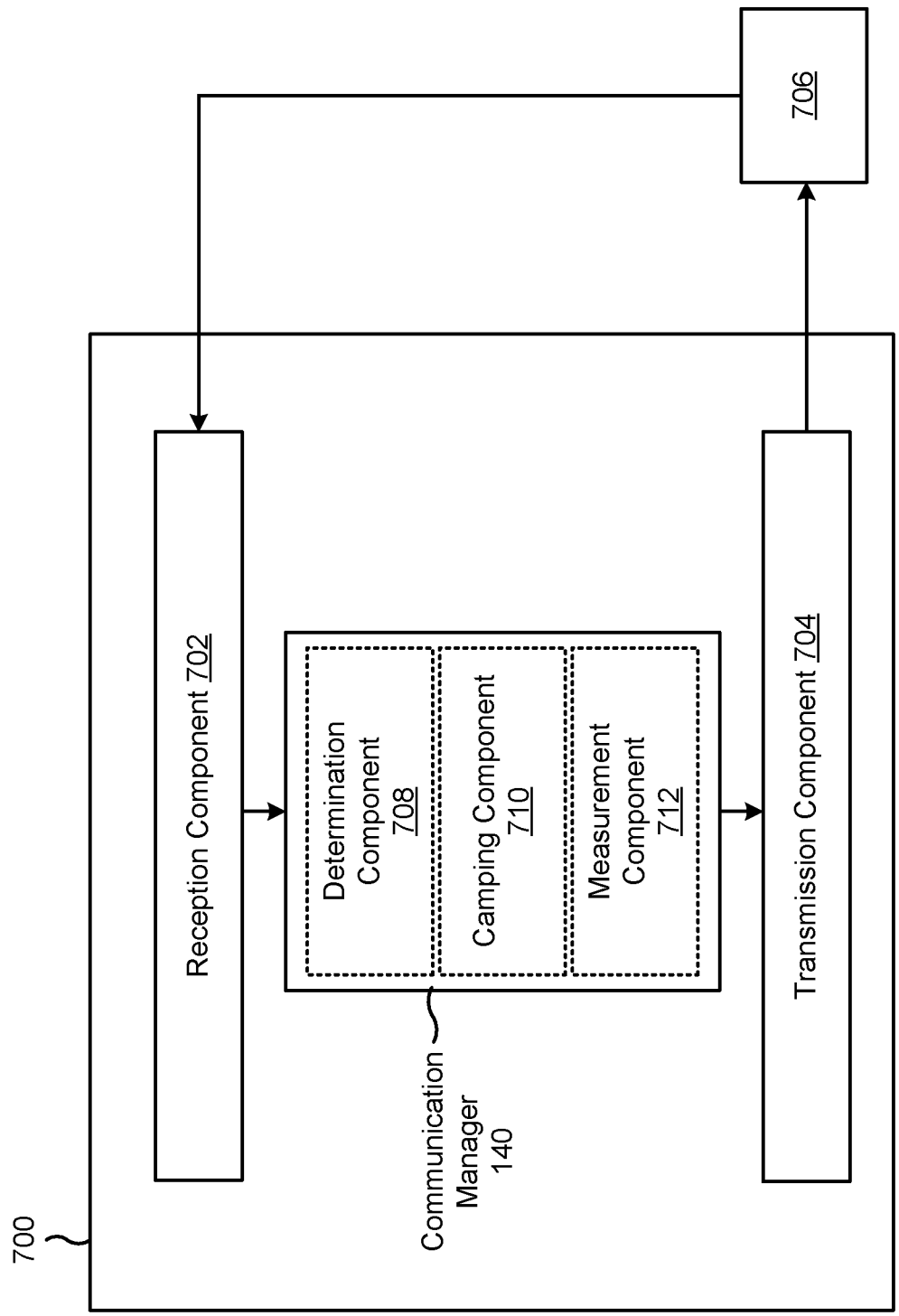
FIGS. 7 and 8 are diagrams of example apparatuses for wireless communication, in accordance with the present disclosure.
Figure 8:
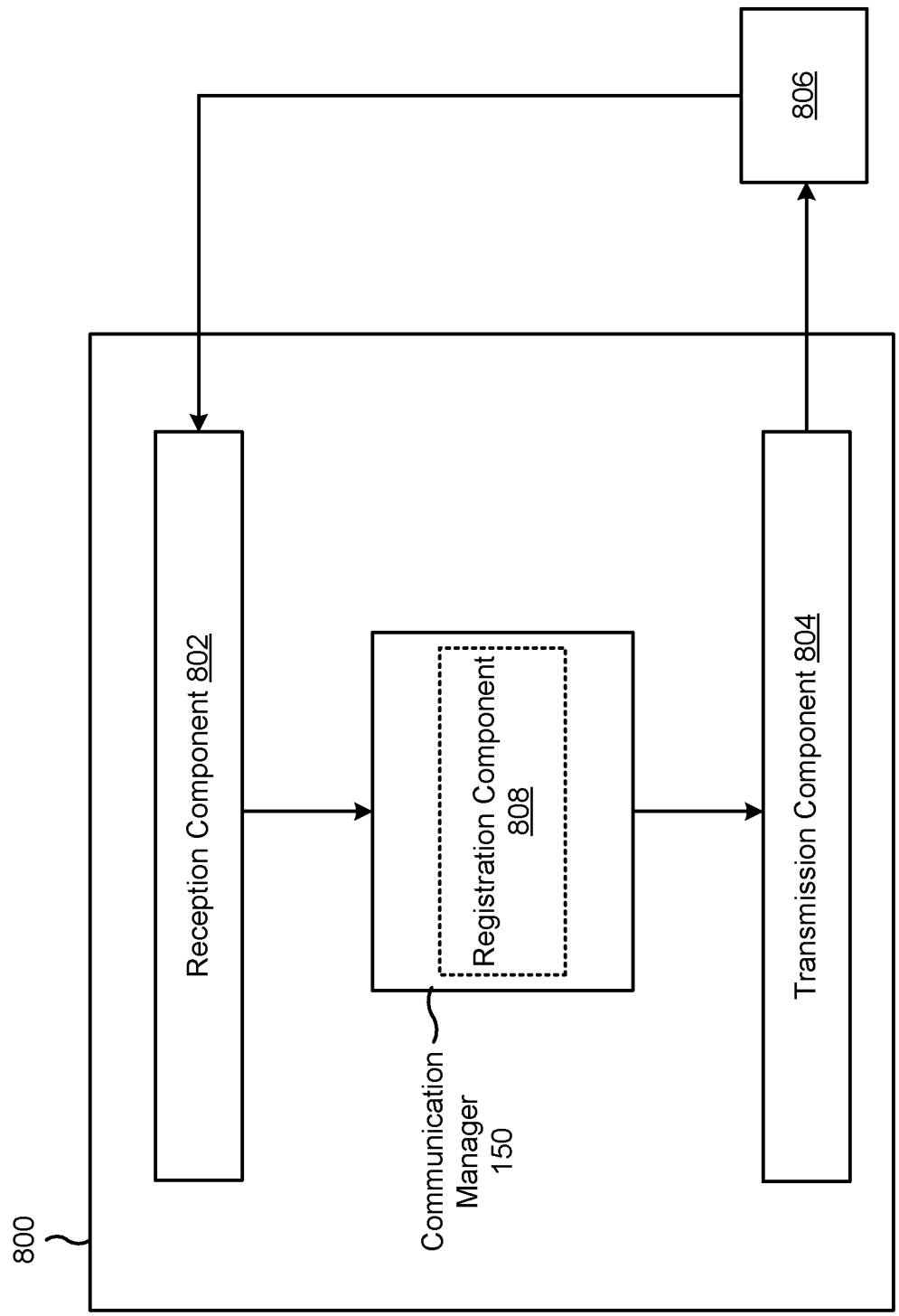

In some aspects, a network entity (e.g., an RU 340, a controller of the RU 340 such as a DU 330 and/or a CU 310, and/or apparatus 800 of FIG. 8) may include means for receiving a first capability message, associated with a UE (e.g., the UE 120 and/or apparatus 700 of FIG. 7), that indicates at least one first frequency band combination (e.g., using antenna 234, modem 232, MIMO detector 236, receive processor 238, controller/processor 240, or memory 242); means for receiving a TAU request or a registration update request, associated with the UE (e.g., using antenna 234, modem 232, MIMO detector 236, receive processor 238, controller/processor 240, or memory 242); and/or means for receiving a second capability message, associated with the UE, that indicates at least one second frequency band combination (e.g., using antenna 234, modem 232, MIMO detector 236, receive processor 238, controller/processor 240, or memory 242). In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
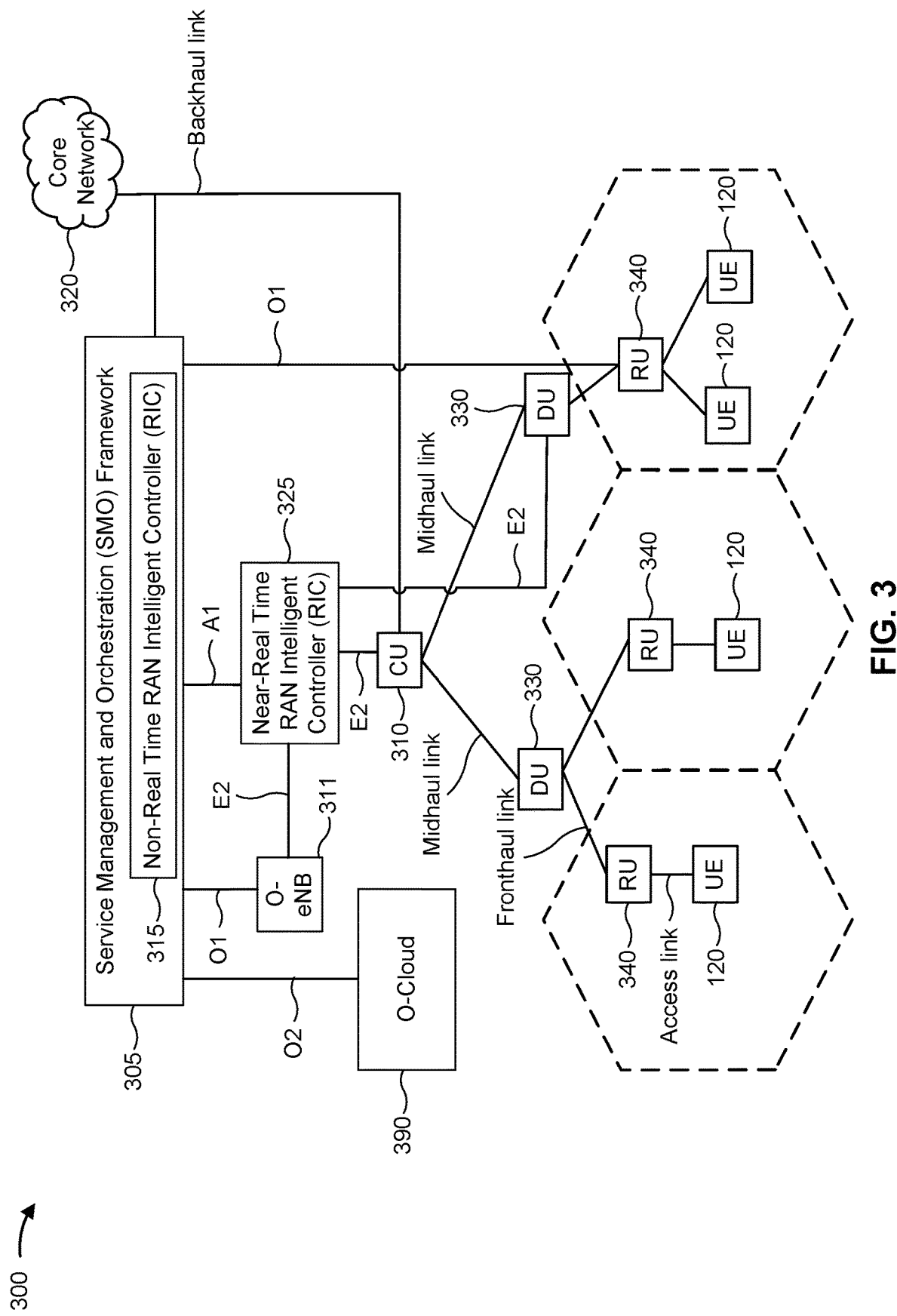
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

During an initial access procedure, a network (e.g., via a network node) may transmit a request for capability information from a UE. For example, the network may transmit a UECapabilityEnquiry message, as defined by 3GPP specifications. Accordingly, the UE may transmit a response to the request. For example, the UE may transmit a UECapabilityInformation message, as defined by 3GPP specifications, encoding information associated with capabilities (hardware- and/or software-related) of the UE.

The UE may indicate frequency bands for which the UE is configured (e.g., frequency bands that an antenna and a receive chain of the UE can physically receive and digitally decode). As used herein, "band" refers to a set of frequencies for communication on the radio spectrum. Generally, a band is larger than a bandwidth part and includes frequency resources used on a wideband channel. As used herein, "bandwidth part" or "BWP" may refer to a contiguous set of physical resource blocks (PRBs), where each PRB includes frequencies corresponding to one or more subcarriers. "Subcarrier" may refer to a frequency based at least in part on a "carrier" frequency, and subcarriers may be aggregated to convey information wirelessly (e.g., using OFDM symbols and/or other RF symbols). In addition to the frequency bands, the UE may indicate a combination of frequency bands that can be used for carrier aggregation (CA) (e.g., using NR carrier aggregation (NRCA)) and/or dual access (e.g., using evolved universal mobile telecommunications system (UMTS) terrestrial radio access (E-UTRAN) NR dual connectivity (ENDC)).

Generally, a size of a response to the request for capability information is limited. For example, the network may limit the response to 8 kilobytes (kb), 9 kb, or another maximum protocol data unit (PDU) size for a PDCP layer associated with the network (whether operating in a standalone (SA) implementation or a non-standalone (NSA) implementation). Accordingly, the UE may drop some frequency band combinations from the response to satisfy a size limit for the response. The UE may prioritize frequency band combinations that are encoded earlier in a frequencyBandListFilter data structure, as defined in 3GPP specifications, included in the request from the network.

Because some frequency band combinations are not indicated to the network, the network may be unable to configure CA or perform handover using a preferred frequency band combination. Accordingly, the UE and the network will experience smaller throughput and lesser reliability and quality in communicating. Furthermore, the chances of retransmissions between the UE and the network are increased, which wastes power and processing resources at the UE and the network. More retransmissions between the UE and the network also result in more network congestion, which causes other devices to waste power and processing resources on retransmissions.

The network can obtain new capability information by releasing a connection with the UE. For example, the network may transmit an RRCConnectionReconfiguration message or an RRCConnectionRelease message, as defined in 3GPP specifications, to trigger the UE to re-establish a connection with the network. As a result, the network may transmit a new request for capability information, and the UE may indicate new frequency band combinations in a response to the request. However, releasing and re-establishing a connection with the UE consumes a significant amount of power and processing resources. Additionally, the UE suffers latency and dropped calls during the connection release and re-establishment.

When the network does not obtain new capability information, the network may select a frequency band combination for which the UE is not configured. Accordingly, the UE will declare radio link failure (RLF) and thus perform cell selection and establish a new connection with the network. As a result, the network may transmit a new request for capability information, and the UE may indicate new frequency band combinations in a response to the request. However, declaring RLF and performing cell selection consumes a significant amount of power and processing resources. Additionally, the UE suffers latency and dropped calls during RLF and cell selection.

Some techniques and apparatuses described herein enable a UE (e.g., UE 120 and/or apparatus 700 of FIG. 7) to trigger a TAU (e.g., in an NSA implementation) or a registration update (e.g., in an SA implementation) in order to update frequency band combinations indicated to a network (e.g., via a network node 110 and/or an apparatus 800 of FIG. 8). For example, the UE 120 may trigger a TAU or a registration update when a previous capability message failed to indicate at least one frequency band combination, a camped frequency band is associated with at least one frequency band combination omitted from the previous capability message, system information received by the UE indicates at least one neighbor band that is associated with at least one frequency band combination omitted from the previous capability message, and/or a measurement associated with at least one neighbor band satisfies a measurement threshold and is associated with at least one frequency band combination omitted from the previous capability message. As a result, the network may configure CA or perform handover using the at least one frequency band combination omitted from the previous capability message. Accordingly, the UE 120 and the network may experience improved throughput and improved reliability and quality in communicating. Furthermore, retransmissions between the UE 120 and the network may be decreased, which conserves power and processing resources at the UE 120 and the network. Fewer retransmissions between the UE 120 and the network also result in less network congestion, which causes other devices to conserve power and processing resources as well. Because the UE 120 uses the TAU or the registration update, the UE 120 and the network conserve power and processing resources as compared with RRC release (or reconfiguration) and as compared with RLF.

Figure 4:
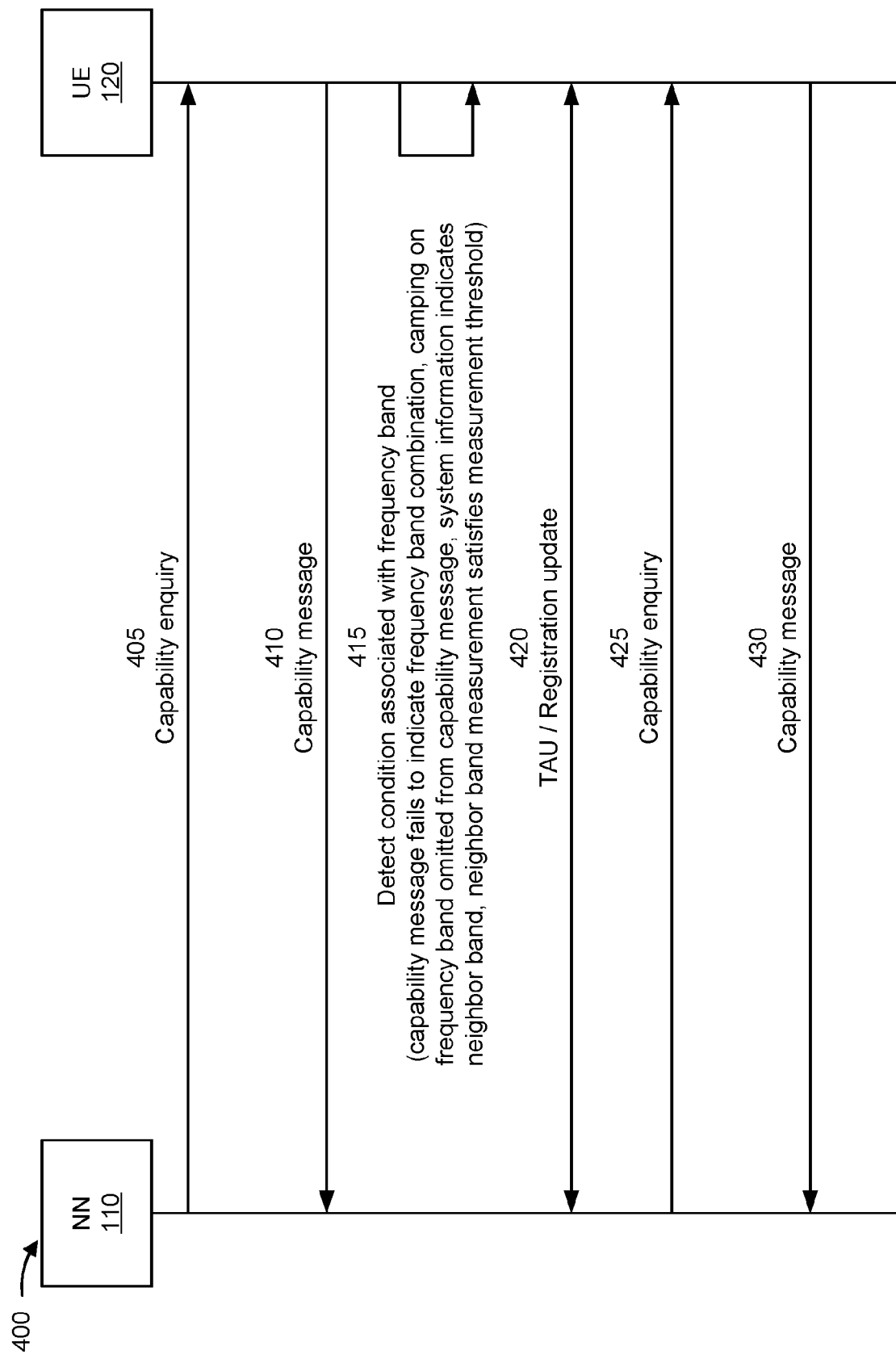
FIG. 4 is a diagram illustrating an example associated with tracking area updates (TAUs) based on frequency band conditions, in accordance with the present disclosure.

FIG. 4 is a diagram illustrating an example 400 associated with TAUs based on frequency band conditions, in accordance with the present disclosure. As shown in FIG. 4, a network node 110 (e.g., an RU 340 and/or a device controlling the RU 340, such as a DU 330 and/or a CU 310) and a UE 120 may communicate with one another (e.g., on a wireless network, such as wireless network 100 of FIG. 1).

As shown by reference number 405, the network node 110 may transmit (e.g., directly or via an RU 340), and the UE 120 may receive, a first capability enquiry. For example, the first capability enquiry may be included in an RRC message, such as a UECapabilityEnquiry message (e.g., defined by 3GPP specifications and/or another standard). The first capability enquiry may include a band list filter, such as a frequencyBandListFilter data structure (e.g., defined by 3GPP specifications and/or another standard). The band list filter may indicate one or more frequency bands (e.g., in an ordered list). Accordingly, some frequency bands may be higher on the band list filter (e.g., ranked higher on the ordered list and/or included in earlier bits of the first capability enquiry) as compared with other frequency bands.

As shown by reference number 410, the UE 120 may transmit, and the network node 110 may receive (e.g., directly or via the RU 340), a first capability message. The UE 120 may transmit the first capability message in response to the first capability enquiry. The first capability message may be included in an RRC message, such as a UECapabilityInformation message (e.g., defined by 3GPP specifications and/or another standard). The first capability message may indicate at least one first frequency band combination, such as in a supportedBandCombinationList data structure (e.g., defined by 3GPP specifications and/or another standard).

A size of the first capability message may be limited. Accordingly, to satisfy a size threshold for the first capability message (e.g., indicated by the first capability enquiry and/or in a PDU configuration), the UE 120 may prioritize frequency band combinations that include frequency bands higher on the band list filter. Therefore, at least one second frequency band combination may be omitted from the first capability message (e.g., not included in the supportedBand-CombinationList data structure, as defined by 3GPP specifications and/or another standard).

As shown by reference number 415, the UE 120 may detect a condition associated with a frequency band for the UE 120. The condition may include a previous capability message transmitted by the UE 120 (e.g., the first capability message, as described above) failing to indicate at least one frequency band combination (e.g., the at least one second frequency band combination, as described above).

Additionally, or alternatively, the condition may include a camped frequency band, associated with the UE 120, being associated with at least one frequency band combination omitted from the previous capability message (e.g., the at least one second frequency band combination omitted from the first capability message, as described above). For example, the UE 120 may transmit, and the network node 110 may receive (e.g., directly or via the RU 340), a request to camp on a frequency band rather than a previous frequency band. Therefore, the UE 120 may detect that the UE 120 is camping on a frequency band included in a frequency band combination that was omitted from the previous capability message (e.g., included in the at least one second frequency band combination omitted from the first capability message, as described above).

Additionally, or alternatively, the condition may include system information, received by the UE 120, indicating at least one neighbor band that is associated with at least one frequency band combination omitted from the previous capability message (e.g., the at least one second frequency band combination omitted from the first capability message, as described above). For example, the network node 110 may broadcast (e.g., directly or via the RU 340), and the UE 120 may receive, system information that includes a frequency band as a neighbor band. Therefore, the UE 120 may detect that the neighbor band is included in a frequency band combination that was omitted from the previous capability message (e.g., included in the at least one second frequency band combination omitted from the first capability message, as described above).

Additionally, or alternatively, the condition may include a measurement, associated with at least one neighbor band, satisfying a measurement threshold and being associated with at least one frequency band combination omitted from the previous capability message (e.g., the at least one second frequency band combination omitted from the first capability message, as described above). For example, the UE 120 may perform a neighbor band measurement on the frequency band. In some aspects, the UE 120 may additionally transmit, and the network node 110 may receive (e.g., directly or via the RU 340), a report indicating the neighbor band measurement. Therefore, the UE 120 may detect that the neighbor band measurement satisfies the measurement threshold and that the frequency band is included in a frequency band combination that was omitted from the previous capability message (e.g., included in the at least one second frequency band combination omitted from the first capability message, as described above).

The conditions described herein may be combined. For example, the UE 120 may trigger a TAU or a registration update (e.g., as described below) in response to detecting that a camped frequency band, associated with the UE 120, is associated with at least one frequency band combination omitted from a previous capability message and detecting that at least one neighbor band, indicated in system information, is associated with at least one frequency band combination omitted from the previous capability message. In another example, the UE 120 may trigger a TAU or a registration update (e.g., as described below) in response to detecting that a camped frequency band, associated with the UE 120, is associated with at least one frequency band combination omitted from a previous capability message and detecting that a measurement, associated with at least one neighbor band, satisfies a measurement threshold and is associated with at least one frequency band combination omitted from the previous capability message. Alternatively, the conditions described herein may be combined into a set such that the UE 120 may trigger a TAU or a registration update (e.g., as described below) in response to a subset, of the set of conditions, being satisfied. For example, the UE 120 may check three or more of the conditions but trigger the TAU or the registration update when two of the conditions are satisfied.

Accordingly, as shown by reference number 420, the UE 120 may trigger a TAU (e.g., when the network node 110 is associated with an NSA implementation) or a registration update (e.g., when the network node 110 is associated with an SA implementation). For example, the UE 120 may transmit, and the network node 110 may receive (e.g., directly or via the RU 340), a TAU request or a registration update request. The UE 120 may trigger the TAU or the registration update based at least in part on detecting the condition (e.g., in response to the condition being detected). In some aspects, the TAU or the registration update may be associated with a flag indicating a request for a capability update. For example, the UE 120 may encode, in the TAU request or the registration update request, at least one bit (e.g., representing a ue_cap_update_needed flag) that indicates the request for the capability update (e.g., by being set to '1' or 'TRUE').

As shown by reference number 425, the network node 110 may transmit (e.g., directly or via an RU 340), and the UE 120 may receive, a second capability enquiry. The network node 110 may transmit the second capability enquiry based at least in part on the TAU or the registration update (e.g., in response to the TAU request or the registration update request). The second capability enquiry may be included in an RRC message, such as a UECapabilityEnquiry message (e.g., defined by 3GPP specifications and/or another standard). The second capability enquiry may include a band list filter, such as a frequencyBandListFilter data structure (e.g., defined by 3GPP specifications and/or another standard). The band list filter may indicate one or more frequency bands (e.g., in an ordered list). Accordingly, some frequency bands may be higher on the band list filter (e.g., ranked higher on the ordered list and/or included in earlier bits of the first capability enquiry) as compared with other frequency bands. The network node 110 may rank some frequency bands higher in the second capability enquiry as compared with the first capability enquiry (and thus other frequency bands lower in the second capability enquiry as compared with the first capability enquiry).

As shown by reference number 430, the UE 120 may transmit, and the network node 110 may receive (e.g., directly or via the RU 340), a second capability message. The UE 120 may transmit the second capability message in response to the second capability enquiry. The second capability message may be included in an RRC message, such as a UECapabilityInformation message (e.g., defined by 3GPP specifications and/or another standard). The second capability message may indicate the at least one second frequency band combination, such as in a supportedBandCombinationList data structure (e.g., defined by 3GPP specifications and/or another standard).

A size of the second capability message may be limited. Accordingly, to satisfy a size threshold for the second capability message (e.g., indicated by the second capability enquiry and/or in a PDU configuration), the UE 120 may prioritize frequency band combinations that include frequency bands higher on the band list filter. Therefore, the at least one first frequency band combination may be omitted from the first capability message (e.g., not included in the supportedBandCombinationList data structure, as defined by 3GPP specifications and/or another standard).

Because the network node 110 is now aware that the UE 120 is capable of using the at least one second frequency band combination, the network node 110 may configure the UE 120 for CA using the at least one second frequency band combination. In another example, the network node 110 may perform handover of the UE 120 using the at least one second frequency band combination. Accordingly, the UE 120 may experience improved throughput and improved reliability and quality in communicating by using the at least one second frequency band combination. Furthermore, the at least one second frequency band combination may reduce retransmissions, which conserves power and processing resources. Fewer retransmissions also result in less network congestion, which causes other devices to conserve power and processing resources as well.

By using techniques as described in connection with FIG. 4, the UE 120 uses the TAU or the registration update to update frequency band combinations indicated to the network node 110. As a result, the UE 120 and the network node 110 conserve power and processing resources as compared with using RRC release (or reconfiguration) to update the frequency band combinations. Similarly, the UE 120 and the network node 110 conserve power and processing resources as compared with using RLF to update the frequency band combinations. Moreover, the UE 120 experiences less latency and fewer (or no) dropped calls as compared with using RRC release (or reconfiguration) or using RLF to update the frequency band combinations.

As indicated above, FIG. 4 is provided as an example. Other examples may differ from what is described with respect to FIG. 4.

Figure 5:
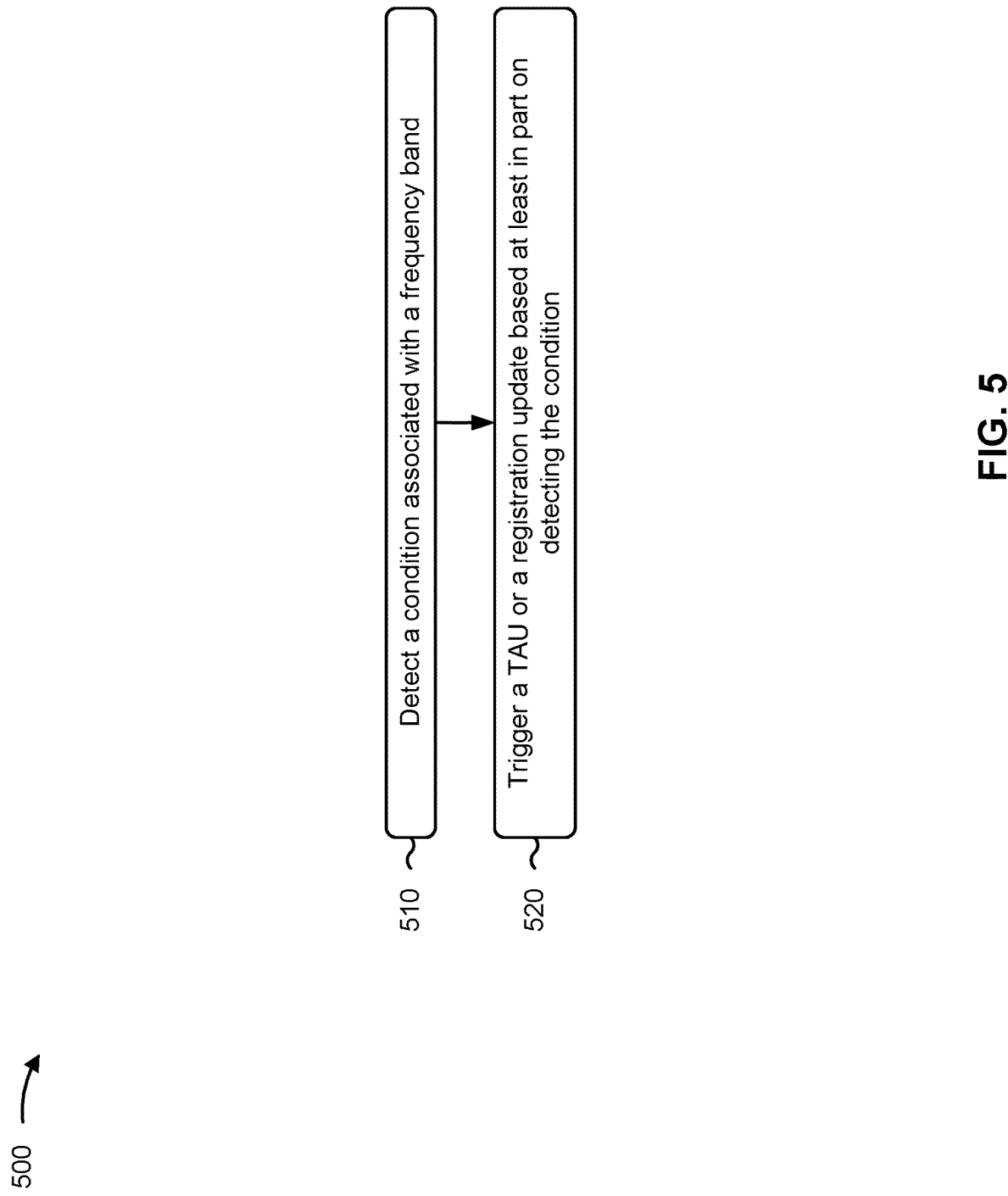
FIGS. 5 and 6 are diagrams illustrating example processes associated with TAUs based on frequency band conditions, in accordance with the present disclosure.

FIG. 5 is a diagram illustrating an example process 500 performed, for example, by a UE, in accordance with the present disclosure. Example process 500 is an example where the UE (e.g., UE 120 and/or apparatus 700 of FIG. 7) performs operations associated with TAUs based on frequency band conditions.

As shown in FIG. 5, in some aspects, process 500 may include detecting a condition associated with a frequency band for the UE (block 510). For example, the UE (e.g., using communication manager 140 and/or determination component 708, depicted in FIG. 7) may detect a condition associated with a frequency band for the UE, as described above, for example, with reference to FIG. 4.

As further shown in FIG. 5, in some aspects, process 500 may include triggering a TAU or a registration update based at least in part on detecting the condition (block 520). For example, the UE (e.g., using communication manager 140 and/or transmission component 704, depicted in FIG. 7) may trigger a TAU or a registration update based at least in part on detecting the condition, as described above, for example, with reference to FIG. 4.

Process 500 may include additional aspects, such as any single aspect or any combination of aspects described below and/or in connection with one or more other processes described elsewhere herein.

In a first aspect, the condition includes: a previous capability message transmitted by the UE failing to indicate at least one frequency band combination; a camped frequency band, associated with the UE, is associated with at least one frequency band combination omitted from the previous capability message; system information received by the UE indicates at least one neighbor band that is associated with at least one frequency band combination omitted from the previous capability message; a measurement associated with at least one neighbor band satisfies a measurement threshold and is associated with at least one frequency band combination omitted from the previous capability message; or any combination thereof.

In a second aspect, alone or in combination with the first aspect, process 500 includes receiving (e.g., using communication manager 140 and/or reception component 702, depicted in FIG. 7) a capability enquiry from a network, and transmitting (e.g., using communication manager 140 and/or transmission component 704) a capability message, in response to the capability enquiry, that indicates at least one first frequency band combination, where the condition is associated with at least one second frequency band combination omitted from the capability message.

In a third aspect, alone or in combination with one or more of the first and second aspects, the TAU or the registration update is associated with a flag indicating a request for a capability update.

In a fourth aspect, alone or in combination with one or more of the first through third aspects, process 500 includes receiving (e.g., using communication manager 140 and/or reception component 702) a capability enquiry from a network after triggering the TAU or the registration update, and transmitting (e.g., using communication manager 140 and/or transmission component 704) a capability message, in response to the capability enquiry, that indicates at least one frequency band combination, where the at least one frequency band combination was omitted from a previous capability message.

In a fifth aspect, alone or in combination with one or more of the first through fourth aspects, the capability enquiry includes a band list filter that indicates at least one frequency band included in the at least one frequency band combination.

In a sixth aspect, alone or in combination with one or more of the first through fifth aspects, process 500 includes camping (e.g., using communication manager 140 and/or camping component 710, depicted in FIG. 7) on the frequency band rather than a previous frequency band, and the condition includes the frequency band being associated with at least one frequency band combination omitted from a previous capability message.

In a seventh aspect, alone or in combination with one or more of the first through sixth aspects, process 500 includes receiving (e.g., using communication manager 140 and/or reception component 702) system information that includes the frequency band as a neighbor band, where the condition includes the neighbor band being associated with at least one frequency band combination omitted from a previous capability message.

In an eighth aspect, alone or in combination with one or more of the first through seventh aspects, process 500 includes performing a neighbor band measurement (e.g., using communication manager 140 and/or measurement component 712, depicted in FIG. 7) on the frequency band, and determining (e.g., using communication manager 140 and/or determination component 708) that the neighbor band measurement satisfies a measurement threshold, where the condition includes the frequency band being associated with at least one frequency band combination omitted from a previous capability message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
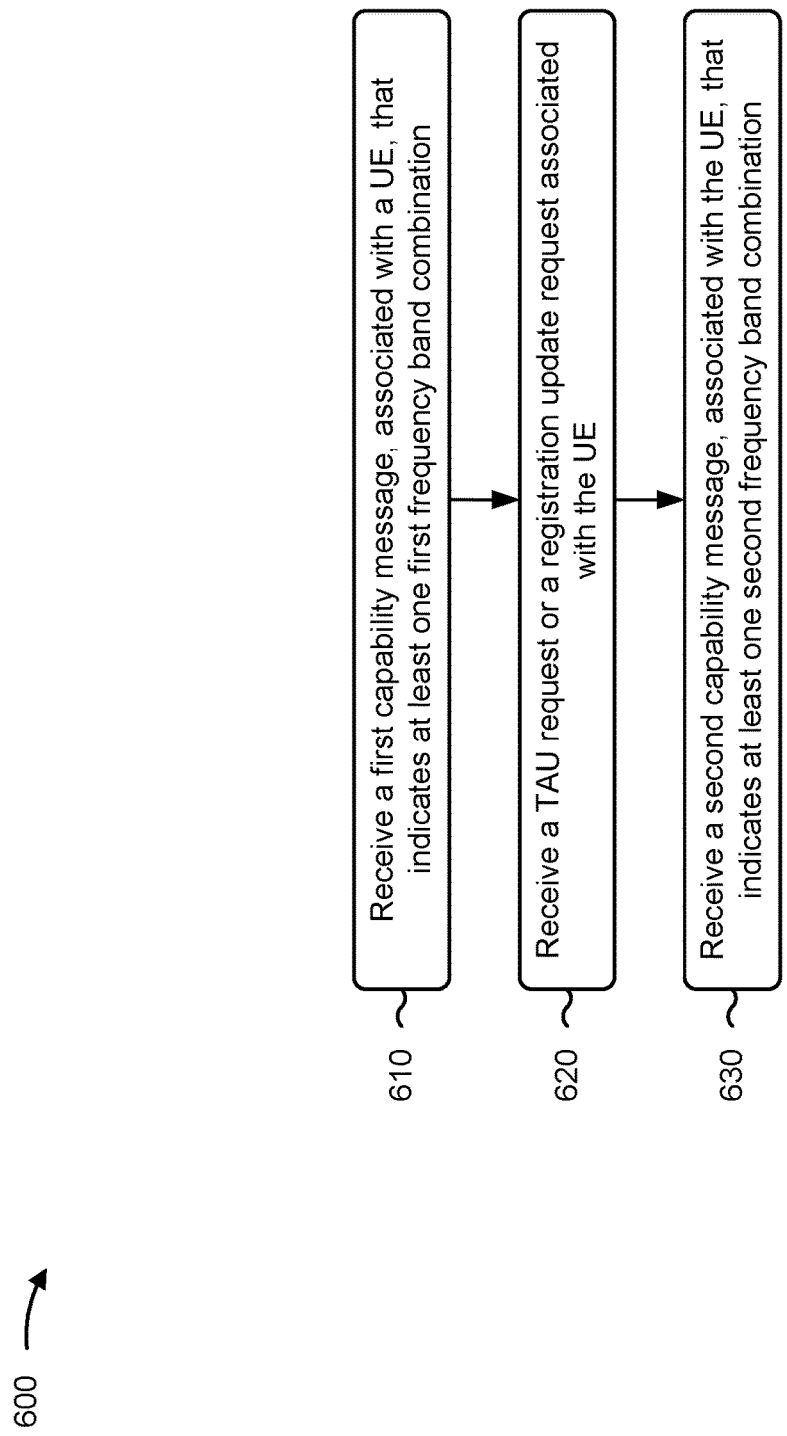

FIG. 6 is a diagram illustrating an example process 600 performed, for example, by a network entity, in accordance with the present disclosure. Example process 600 is an example where the network entity (e.g., network node 110 and/or apparatus 800 of FIG. 8) performs operations associated with TAUs based on frequency band conditions.

As shown in FIG. 6, in some aspects, process 600 may include receiving a first capability message, associated with a UE (e.g., UE 120 and/or apparatus 700 of FIG. 7), that indicates at least one first frequency band combination (block 610). For example, the network entity (e.g., using communication manager 150 and/or reception component 802, depicted in FIG. 8) may receive a first capability message, associated with a UE, that indicates at least one first frequency band combination, as described above, for example, with reference to FIG. 4.

As further shown in FIG. 6, in some aspects, process 600 may include receiving a TAU request or a registration update request, associated with the UE (block 620). For example, the network entity (e.g., using communication manager 150 and/or reception component 802) may receive a TAU request or a registration update request, associated with the UE, as described above, for example, with reference to FIG. 4.

As further shown in FIG. 6, in some aspects, process 600 may include receiving a second capability message, associated with the UE, that indicates at least one second frequency band combination (block 630). For example, the network entity (e.g., using communication manager 150 and/or reception component 802) may receive a second capability message, associated with the UE, that indicates at least one second frequency band combination, as described above, for example, with reference to FIG. 4.

Process 600 may include additional aspects, such as any single aspect or any combination of aspects described below and/or in connection with one or more other processes described elsewhere herein.

In a first aspect, process 600 includes transmitting (e.g., using communication manager 150 and/or transmission component 804, depicted in FIG. 8) a first capability enquiry, such that the first capability message is received in response to the first capability enquiry.

In a second aspect, alone or in combination with the first aspect, the first capability enquiry includes a band list filter that indicates at least one frequency band included in the at least one first frequency band combination.

In a third aspect, alone or in combination with one or more of the first and second aspects, the TAU request or the registration update request is associated with a flag indicating a request for a capability update.

In a fourth aspect, alone or in combination with one or more of the first through third aspects, process 600 includes transmitting (e.g., using communication manager 150 and/or transmission component 804) a second capability enquiry after receiving the TAU request or the registration update request, such that the second capability message is received in response to the second capability enquiry.

In a fifth aspect, alone or in combination with one or more of the first through fourth aspects, the second capability enquiry includes a band list filter that indicates at least one frequency band included in the at least one second frequency band combination.

In a sixth aspect, alone or in combination with one or more of the first through fifth aspects, process 600 includes receiving (e.g., using communication manager 150 and/or reception component 802) a request, associated with the UE, to camp on a new frequency band rather than a previous frequency band, such that the TAU request or the registration update request is received after the request to camp is received.

In a seventh aspect, alone or in combination with one or more of the first through sixth aspects, process 600 includes transmitting (e.g., using communication manager 150 and/or transmission component 804) system information that indicates at least one neighbor band, where the at least one neighbor band is included in the at least one second frequency band combination.

In an eighth aspect, alone or in combination with one or more of the first through seventh aspects, process 600 includes receiving (e.g., using communication manager 150 and/or reception component 802) a report indicating a measurement on a neighbor band, where the neighbor band is included in the at least one second frequency band combination.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, an RU, or another wireless communication device) using the reception component 702 and the transmission component 704. As further shown, the apparatus 700 may include the communication manager 140. The communication manager 140 may include one or more of a determination component 708, a camping component 710, and/or a measurement component 712, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

In some aspects, the determination component 708 may detect a condition associated with a frequency band for the apparatus 700. The determination component 708 may include a modem, a demodulator, a MIMO detector, a receive processor, a modulator, a transmit MIMO processor, a transmit processor, a controller/processor, a memory, or a combination thereof, of the UE described in connection with FIG. 2. Accordingly, the transmission component 704 may trigger a TAU or a registration update based at least in part on (e.g., in response to) the determination component 708 detecting the condition. The transmission component 704 may transmit a TAU request or a registration update request to a network (e.g., via the apparatus 706).

In some aspects, the reception component 702 may receive a capability enquiry (e.g., from the network via the apparatus 706). Accordingly, the transmission component 704 may transmit a capability message, in response to the capability enquiry, that indicates at least one first frequency band combination. The condition detected by the determination component 708 may be associated with at least one second frequency band combination omitted from the capability message.

Additionally, the reception component 702 may receive a capability enquiry (e.g., from the network via the apparatus 706) after the transmission component 704 triggers the TAU or the registration update. Accordingly, the transmission component 704 may transmit a capability message, in response to the capability enquiry, that indicates at least one frequency band combination. The at least one frequency band combination may have been omitted from a previous capability message.

In some aspects, the camping component 710 may camp on the frequency band rather than a previous frequency band. The camping component 710 may include one or more antennas, a modem, a demodulator, a MIMO detector, a receive processor, a modulator, a transmit MIMO processor, a transmit processor, a controller/processor, a memory, or a combination thereof, of the UE described in connection with FIG. 2. The condition detected by the determination component 708 may include the frequency band being associated with at least one frequency band combination omitted from a previous capability message.

Additionally, or alternatively, the reception component 702 may receive system information (e.g., from the network via the apparatus 706) that includes the frequency band as a neighbor band. The condition detected by the determination component 708 may include the neighbor band being associated with at least one frequency band combination omitted from a previous capability message.

Additionally, or alternatively, the measurement component 712 may perform a neighbor band measurement on the frequency band. The measurement component 712 may include one or more antennas, a modem, a demodulator, a MIMO detector, a receive processor, a controller/processor, a memory, or a combination thereof, of the UE described in connection with FIG. 2. The determination component 708 may determine that the neighbor band measurement satisfies a measurement threshold. Accordingly, the condition detected by the determination component 708 may include the frequency band being associated with at least one frequency band combination omitted from a previous capability message.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

FIG. 8 is a diagram of an example apparatus 800 for wireless communication, in accordance with the present disclosure. The apparatus 800 may be a network entity, or a network entity may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, an RU, or another wireless communication device) using the reception component 802 and the transmission component 804. As further shown, the apparatus 800 may include the communication manager 150. The communication manager 150 may include a registration component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

In some aspects, the reception component 802 may receive a first capability message, associated with a UE (e.g., the apparatus 806), that indicates at least one first frequency band combination. Additionally, the reception component 802 may receive a TAU request or a registration update request associated with the UE. Accordingly, the registration component 808 may perform a TAU or a registration update in response to the request. The registration component 808 may include one or more antennas, a modem, a demodulator, a MIMO detector, a receive processor, a modulator, a transmit MIMO processor, a transmit processor, a controller/processor, a memory, or a combination thereof, of the network node described in connection with FIG. 2. Moreover, the reception component 802 may receive a second capability message, associated with the UE, that indicates at least one second frequency band combination.

In some aspects, the transmission component 804 may transmit a first capability enquiry. Accordingly, the first capability message may be received in response to the first capability enquiry. Furthermore, the transmission component 804 may transmit a second capability enquiry after the reception component 802 receives the TAU request or the registration update request. Accordingly, the second capability message may be received in response to the second capability enquiry.

In some aspects, the reception component 802 may receive a request, associated with the UE, to camp on a new frequency band rather than a previous frequency band. Accordingly, the TAU request or the registration update request may be received after the request to camp is received.

Additionally, or alternatively, the transmission component 804 may transmit system information that indicates at least one neighbor band, where the at least one neighbor band is included in the at least one second frequency band combination. Additionally, or alternatively, the reception component 802 may receive a report indicating a measurement on a neighbor band, where the neighbor band is included in the at least one second frequency band combination.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: detecting a condition associated with a frequency band for the UE; and triggering a tracking area update (TAU) or a registration update based at least in part on detecting the condition.

Aspect 2: The method of Aspect 1, wherein the condition includes: a previous capability message transmitted by the UE failing to indicate at least one frequency band combination; a camped frequency band, associated with the UE, is associated with at least one frequency band combination omitted from the previous capability message; system information received by the UE indicates at least one neighbor band that is associated with at least one frequency band combination omitted from the previous capability message; a measurement associated with at least one neighbor band satisfies a measurement threshold and is associated with at least one frequency band combination omitted from the previous capability message; or any combination thereof.

Aspect 3: The method of any of Aspects 1 through 2, further comprising: receiving a capability enquiry from a network; and transmitting a capability message, in response to the capability enquiry, that indicates at least one first frequency band combination, wherein the condition is associated with at least one second frequency band combination omitted from the capability message.

Aspect 4: The method of any of Aspects 1 through 3, wherein the TAU or the registration update is associated with a flag indicating a request for a capability update.

Aspect 5: The method of Aspect 4, further comprising: receiving a capability enquiry from a network after triggering the TAU or the registration update; and transmitting a capability message, in response to the capability enquiry, that indicates at least one frequency band combination, wherein the at least one frequency band combination was omitted from a previous capability message.

Aspect 6: The method of Aspect 5, wherein the capability enquiry includes a band list filter that indicates at least one frequency band included in the at least one frequency band combination.

Aspect 7: The method of any of Aspects 1 through 6, further comprising: camping on the frequency band rather than a previous frequency band, wherein the condition includes the frequency band being associated with at least one frequency band combination omitted from a previous capability message.

Aspect 8: The method of any of Aspects 1 through 7, further comprising: receiving system information that includes the frequency band as a neighbor band, wherein the condition includes the neighbor band being associated with at least one frequency band combination omitted from a previous capability message.

Aspect 9: The method of any of Aspects 1 through 8, further comprising: performing a neighbor band measurement on the frequency band; and determining that the neighbor band measurement satisfies a measurement threshold, wherein the condition includes the frequency band being associated with at least one frequency band combination omitted from a previous capability message.

Aspect 10: A method of wireless communication performed by a network entity, comprising: receiving a first capability message, associated with a user equipment (UE), that indicates at least one first frequency band combination; receiving a tracking area update (TAU) request or a registration update request, associated with the UE; and receiving a second capability message, associated with the UE, that indicates at least one second frequency band combination.

Aspect 11: The method of Aspect 10, further comprising: transmitting a first capability enquiry; and wherein the first capability message is received in response to the first capability enquiry, wherein the first capability message is received in response to the first capability enquiry.

Aspect 12: The method of Aspect 11, wherein the first capability enquiry includes a band list filter that indicates at least one frequency band included in the at least one first frequency band combination.

Aspect 13: The method of any of Aspects 10 through 12, wherein the TAU request or the registration update request is associated with a flag indicating a request for a capability update.

Aspect 14: The method of any of Aspects 10 through 13, further comprising: transmitting a second capability enquiry after receiving the TAU request or the registration update request; and wherein the second capability message is received in response to the second capability enquiry, wherein the second capability message is received in response to the second capability enquiry.

Aspect 15: The method of Aspect 14, wherein the second capability enquiry includes a band list filter that indicates at least one frequency band included in the at least one second frequency band combination.

Aspect 16: The method of any of Aspects 10 through 15, further comprising: receiving a request, associated with the UE, to camp on a new frequency band rather than a previous frequency band, wherein the TAU request or the registration update request is received after the request to camp is received.

Aspect 17: The method of any of Aspects 10 through 16, further comprising: transmitting system information that indicates at least one neighbor band, wherein the at least one neighbor band is included in the at least one second frequency band combination.

Aspect 18: The method of any of Aspects 10 through 17, further comprising: receiving a report indicating a measurement on a neighbor band; and wherein the neighbor band is included in the at least one second frequency band combination. wherein the neighbor band is included in the at least one second frequency band combination.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        detect a condition associated with a frequency band for the UE, wherein the condition includes:
            a capability message transmitted by the UE failing to indicate at least one frequency band combination;
            a camped frequency band, associated with the UE, being associated with the at least one frequency band combination omitted from the capability message;
            system information received by the UE indicating at least one neighbor band that is associated with the at least one frequency band combination omitted from the capability message;
            a measurement associated with the at least one neighbor band satisfying a measurement threshold and being associated with the at least one frequency band combination omitted from the capability message; or
            any combination thereof; and
        trigger an update based at least in part on the condition being detected, wherein the update is a tracking area update (TAU) or a registration update.

2. The apparatus of claim 1,
wherein the one or more processors are further configured to:
  receive a capability enquiry from a network; and
  transmit the capability message, in response to the capability enquiry, that indicates at least one first frequency band combination,
    wherein the condition is associated with at least one second frequency band combination omitted from the capability message.

3. The apparatus of claim 1,
wherein the update is associated with a flag indicating a request for a capability update.

4. The apparatus of claim 3,
wherein the one or more processors are further configured to:
  receive a capability enquiry from a network after the update is triggered; and
  transmit a second capability message, in response to the capability enquiry, that indicates the at least one frequency band combination,
    wherein the at least one frequency band combination was omitted from the capability message.

5. The apparatus of claim 4,
wherein the capability enquiry includes a band list filter that indicates at least one frequency band included in the at least one frequency band combination.

6. The apparatus of claim 1,
wherein the one or more processors are further configured to:
  camp on the frequency band rather than a previous frequency band,
    wherein the condition includes the frequency band being associated with the at least one frequency band combination omitted from the capability message.

7. The apparatus of claim 1,
wherein the one or more processors are further configured to:
  receive system information that includes the frequency band as a neighbor band,
    wherein the condition includes the neighbor band being associated with the at least one frequency band combination omitted from the capability message.

8. The apparatus of claim 1,
wherein the one or more processors are further configured to:
  perform a neighbor band measurement on the frequency band; and
  determine that the neighbor band measurement satisfies a measurement threshold,
    wherein the condition includes the frequency band being associated with the at least one frequency band combination omitted from the capability message.

9. A method of wireless communication performed by a user equipment (UE), comprising:
  detecting a condition associated with a frequency band for the UE, wherein the condition includes:
    a capability message transmitted by the UE failing to indicate at least one frequency band combination;
    a camped frequency band, associated with the UE, being associated with the at least one frequency band combination omitted from the capability message;
    system information received by the UE indicating at least one neighbor band that is associated with the at least one frequency band combination omitted from the capability message;
    a measurement associated with the at least one neighbor band satisfying a measurement threshold and being associated with the at least one frequency band combination omitted from the capability message; or
    any combination thereof; and
  triggering an update based at least in part on the condition being detected, wherein the update is a tracking area update (TAU) or a registration update.

10. The method of claim 9, further comprising:
  receiving a capability enquiry from a network; and
  transmitting the capability message, in response to the capability enquiry, that indicates at least one first frequency band combination,
    wherein the condition is associated with at least one second frequency band combination omitted from the capability message.

11. The method of claim 9,
wherein the update is associated with a flag indicating a request for a capability update.

12. The method of claim 11, further comprising:
  receiving a capability enquiry from a network after the TAU or the registration update is triggered; and
  transmitting a second capability message, in response to the capability enquiry, that indicates the at least one frequency band combination,
    wherein the at least one frequency band combination was omitted from the capability message.

13. The method of claim 12,
wherein the capability enquiry includes a band list filter that indicates at least one frequency band included in the at least one frequency band combination.

14. The method of claim 9, further comprising:
  camping on the frequency band rather than a previous frequency band,
    wherein the condition includes the frequency band being associated with the at least one frequency band combination omitted from the capability message.

15. The method of claim 9, further comprising:
  receiving system information that includes the frequency band as a neighbor band,
    wherein the condition includes the neighbor band being associated with the at least one frequency band combination omitted from the capability message.

16. The method of claim 9, further comprising:
  performing a neighbor band measurement on the frequency band; and
  determining that the neighbor band measurement satisfies a measurement threshold,
    wherein the condition includes the frequency band being associated with the at least one frequency band combination omitted from the capability message.

17. A non-transitory computer-readable medium storing a set of instructions for wireless communication, the set of instructions comprising:
  one or more instructions that, when executed by one or more processors of a user equipment (UE), cause the UE to:
    detect a condition associated with a frequency band for the UE, wherein the condition includes:
      a capability message transmitted by the UE failing to indicate at least one frequency band combination;

a camped frequency band, associated with the UE, being associated with the at least one frequency band combination omitted from the capability message;

system information received by the UE indicating at least one neighbor band that is associated with the at least one frequency band combination omitted from the capability message;

a measurement associated with the at least one neighbor band satisfying a measurement threshold and being associated with the at least one frequency band combination omitted from the capability message; or any combination thereof; and trigger an update based at least in part on detecting the condition, wherein the update is a tracking area update (TAU) or a registration update.

18. The non-transitory computer-readable medium of claim 17, wherein the set of instructions further cause the UE to:
receive a capability enquiry from a network; and
transmit the capability message, in response to the capability enquiry, that indicates at least one first frequency band combination,
wherein the condition is associated with at least one second frequency band combination omitted from the capability message.

19. The non-transitory computer-readable medium of claim 17, wherein the update is associated with a flag indicating a request for a capability update.

20. The non-transitory computer-readable medium of claim 17, wherein the set of instructions further cause the UE to:
camp on the frequency band rather than a previous frequency band,
wherein the condition includes the frequency band being associated with the at least one frequency band combination omitted from the capability message.

* * * * *